AUTOMATIC FREQUENCY SEARCH AND TRACK SYSTEM

Filed Nov. 16, 1956 2 Sheets-Sheet 1

Inventor
LEONARD J. RENNENKAMPF
By Philip M. Bolton
Attorney

Inventor
LEONARD J. RENNENKAMPF
By Philip M. Bolton
Attorney 2,951,150

AUTOMATIC FREQUENCY SEARCH AND TRACK SYSTEM

Leonard J. Rennenkampf, North Caldwell, N.J., assignor to International Telephone and Telegraph Corporation, Nutley, N.J., a corporation of Maryland Filed Nov. 16, 1956, Ser. No. 623,727

8 Claims. (Cl. 250—20)

Figure 1:
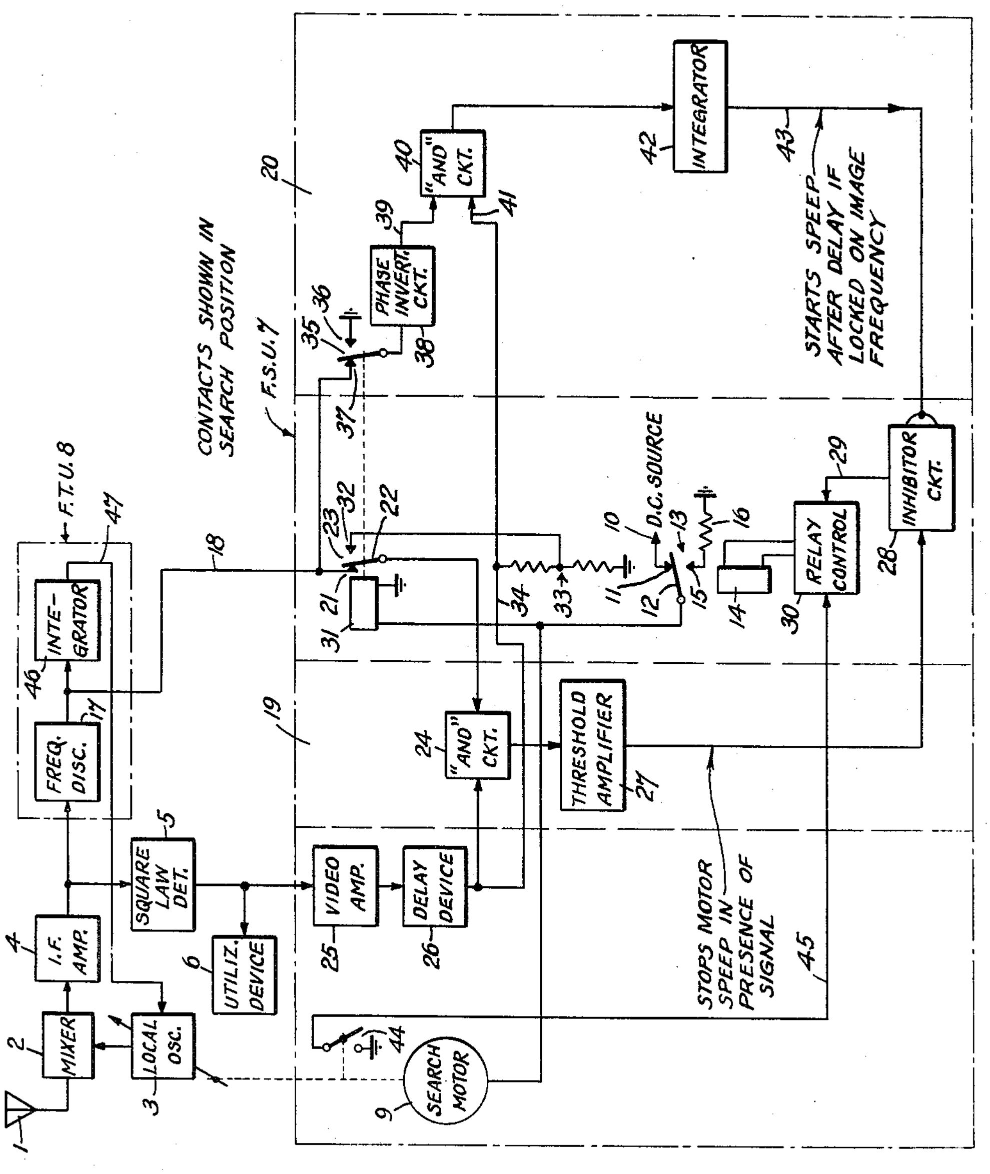

This invention relates to an automatic frequency search and track system.

Systems are known for automatically varying the tuning of an oscillator over a given frequency range until the frequency of the oscillator is brought into predetermined relationship to the frequency of a signal from some other source and for maintaining this relationship despite shifts in the frequency of the signal from said source or any tendency of the oscillator to change its output frequency. An example of this is in superheterodyne receivers in which frequency scanning is accomplished by continuously varying the frequency of the local oscillator over a given range, halting the scanning when the signal is picked up and then, by means of an automatic frequency tracking or control system, locking onto the signal frequency so that even if the signal frequency shifts the local oscillator is correspondingly varied and the signal is not lost.

Many such systems, particularly receivers adapted to search over a relatively wide frequency band, use mechanical tuning for the frequency search unit and electrical tuning for the automatic frequency tracking or control unit. In such systems, the searching and the tracking units are to a considerable extent independent of each other, the searching unit being disabled after the local oscillator has been brought into the desired frequency relationship with the signal frequency so as to produce the desired intermediate frequency output; and the tracking unit then taking over and maintaining this relationship to produce the desired intermediate frequency output.

In such receivers, the local oscillator output ($F_{lo}$) is mixed with the input signal ($F_{sig}$) to produce an intermediate frequency signal ($F_{if}$). There are, however, two points of the local oscillator frequency ($F_{lo}$) at which the desired intermediate frequency ($F_{if}$) is obtained: one at which the local oscillator frequency is above the input signal frequency by an amount equal to the intermediate frequency ($F_{lo}-F_{sig}=F_{if}$), and the other at which the local oscillator frequency is below the input signal frequency by an amount equal to the intermediate frequency ($F_{sig}-F_{lo}=F_{if}$).

Actually, the intermediate frequency is not a single frequency but a narrow band of frequencies, and these narrow bands of frequencies are reversed images of each other under these two conditions in the first of which the local oscillator frequency is less than the signal frequency and in the other of which the local oscillator frequency is greater. It is important that the frequency search unit stop on attaining the correct image for which the system has been designed, as will be apparent when the operation of the frequency tracking unit is considered.

Generally, the frequency tracking unit in such systems examines the intermediate frequency output. If this output is above the center frequency, a voltage of one polarity is obtained; if below, a voltage of another polarity is obtained. These voltages are applied to correct the frequency of the local oscillator.

Assume in a given case that the system is designed to operate on the lower image with $F_{sig}-F_{lo}=F_{if}$. If the local oscillator frequency increases above the desired frequency by a certain increment $\Delta f$, the intermediate frequency becomes too low by the same amount:

$$F_{sig}-(F_{lo}+\Delta f)=F_{if}-\Delta f$$

The frequency tracking unit produces a voltage of one polarity (say, negative) to reduce the local oscillator frequency to $F_{lo}$. On the other hand, if the local oscillator frequency decreases by a certain increment $\Delta f$ below the desired frequency with relation to the signal, the intermediate frequency becomes too high by the same increment: $F_{sig}-(F_{lo}-\Delta f)=F_{lo}+\Delta f$. The frequency tracking system thereupon produces an opposite voltage (say, positive) to increase the local oscillator frequency to $F_{lo}$ and thereby correct its frequency.

Consider, however, the action of the above frequency tracking system if the frequency search unit stops on the upper image with the local oscillator frequency being greater than the signal frequency: $F_{lo}>F_{sig}$. The resultant intermediate frequency is $F_{lo}-F_{sig}=F_{if}$. Assuming, however, an increase in the local oscillator frequency by an increment $\Delta f$, the intermediate frequency will increase by the same amount: $F_{lo}+\Delta f-F_{sig}=F_{if}+\Delta f$. In this example, however, the frequency tracking system will not correct this deviation. As pointed out hereinbefore in discussing the first image, this frequency tracking system responding to the increase in the intermediate frequency above the center frequency will produce a voltage of the second polarity (positive in this example) which, when applied to the local oscillator, will raise the frequency of the local oscillator and not lower it. This will further raise the intermediate frequency above the center frequency and instead of correcting the frequency of the local oscillator will further increase its deviation from the center frequency. The same incorrect operation will occur if the local oscillator frequency deviates (due, for example, to a change in load or temperature conditions) below the center frequency. The automatic frequency tracking unit will further increase this deviation from center frequency for the second image. Generally, the signal output will become lost and in many such systems the system goes back into search condition where the automatic frequency search unit takes over. It is clear that correct tracking will not occur for the second image and indeed the entire system will not operate properly. Obviously, this problem exists whether the local oscillator varies with respect to the signal or the signal varies with respect to the local oscillator. The problem of stopping on the wrong image is more likely to occur where the input signal is pulsed, such as from pulsed radio frequency transmitters. It is also more likely to occur in systems where such pulsed radio frequency is used for tracking a swiftly moving object.

Various expedients have been suggested for dealing with this problem. In general, such expedients have proven unsatisfactory either because they were not sufficiently reliable or because they involved too complex and uneconomical circuitry, or for the further reason that they involved too much of a time delay before the proper image was acquired.

An object of the present invention is the provision of an improved frequency search system for scanning an oscillator over a predetermined range to bring the frequency of said oscillator into a given relationship with the frequency of a given signal.

Another object of the present invention is the provision of an improved frequency search and tracking system in which scanning by varying the frequency of a local oscillator is halted on the desired intermediate frequency image and not on the undesired image.

Another object of the present invention is the provision of an improved frequency search and tracking receiver for pulsed radio frequency signals.

A feature of the present invention is the provision of relatively simple and economical circuitry for carrying out the above-mentioned objects.

Figure 2:
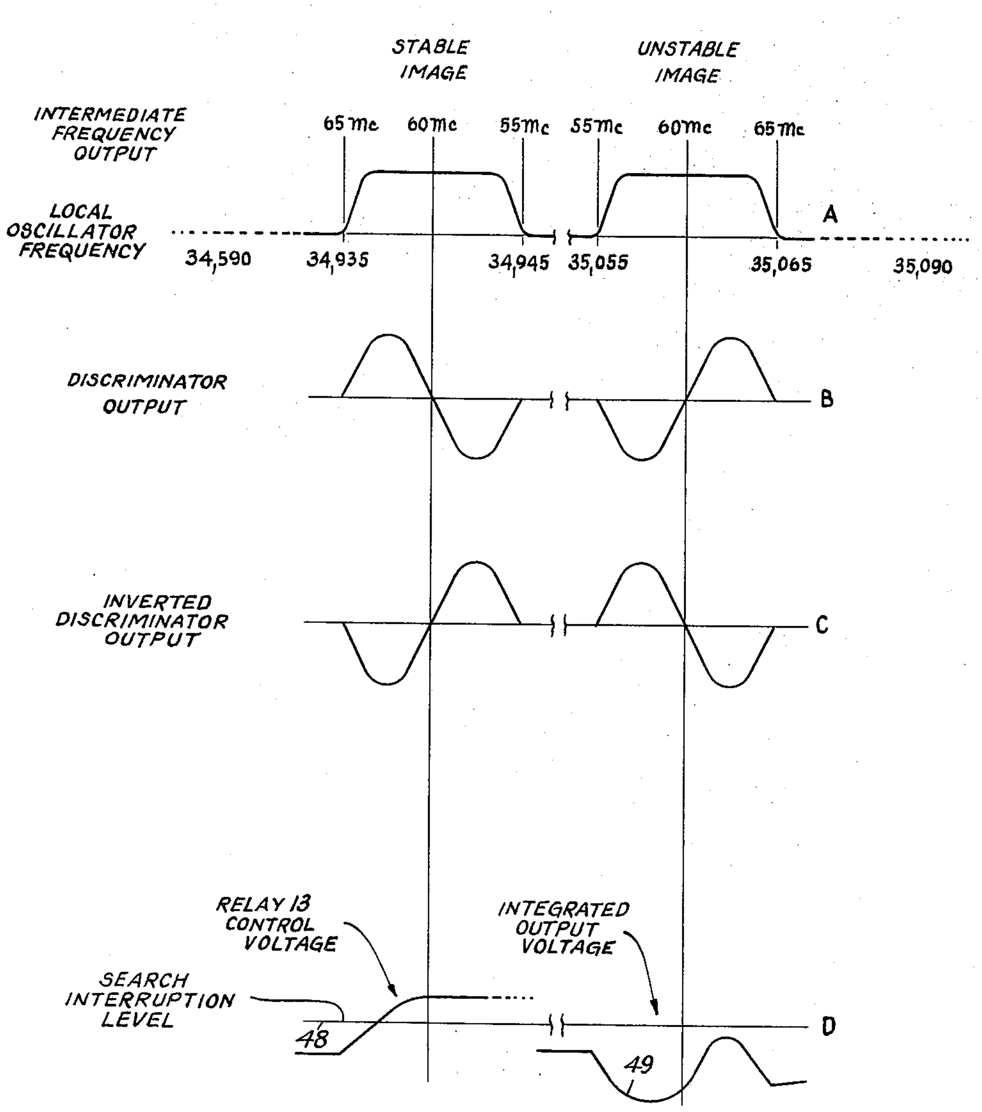

Other and further objects of the present invention will become apparent and the foregoing will be better understood with reference to the following description of an embodiment thereof, reference being had to the drawings, in which:

Fig. 1 is a schematic and block diagram of a receiver for receiving pulsed radio frequency (R.-F.) signals, which receiver is adapted to scan over a broad frequency band to pick up the signal, and which locks onto it; and Fig. 2 is a set of curves used in explaining the operation of the receiver of Fig. 1.

In carrying out my invention, use is made of the fact that the two I.-F. images are the reverse of each other. Thus, as the local oscillator scans from one end of its range to the other, in one image the I.-F. will go from the highest to the lowest frequency while in the opposite image the I.-F. will go from the lowest to the highest frequency. A frequency discriminator with a crossover or center frequency corresponding to the center frequency of the I.-F. will then produce, for example, positive voltages followed by negative voltages for the first image and negative voltages, followed by positive voltages for the second image. The output of the discriminator is applied to control a "stop" and a "go" channel, the "stop" channel interrupting search, if first actuated, and blocking the "go" channel, and the "go" channel, if first actuated, blocking the "stop" channel for a sufficient length of time to allow the scanning to pass the undesired image. Thus, during scanning, the first polarity of discriminator output voltage of the stable image is used to actuate the "stop" channel and lock it into "stop" position as long as the input signal is being received with an adequate input. On the unstable image, the "stop" channel is not affected by the polarity first encountered, but the "go" channel is, and the actuation of the "go" channel blocks the "stop" channel so that it will not be affected until the unstable image has been passed. The foregoing operation is explained in more detail hereinafter with reference to the drawings.

Referring now to Fig. 1, an antenna system 1 for picking up such pulsed R.-F. signals is coupled to a mixer 2 to which is likewise coupled the output of a tunable local oscillator 3. The output of the mixer is fed through an I.-F. amplifier 4 to a detector 5 which is preferably a square-law detector whose output in the form of video pulses is then applied to a suitable utilization device 6. Since this utilization device 6 forms no part of the present invention, details thereof are omitted.

The local oscillator 3 may be in the form of a reflex klystron, and the receiver is tuned by tuning the local oscillator. Searching is controlled by a frequency search unit 7, while tracking is controlled by a frequency tracking unit 8.

During searching, the frequency of the local oscillator is continuously and repeatedly varied over a wide band by the motor 9 which is mechanically linked by means such as, for example, a cam to the resonators of the klystron oscillator 3, the motor 9, in turn, being driven from a D.-C. source 10 which is connected thereto via the back contact 11 and armature 12 of a relay 13. Upon energization of relay coil 14, the armature 12 is disconnected from the D.-C. source 10, swinging to the forward contact 15 which is connected by current limiting resistor 16 to ground, thereby swiftly bringing the search motor 9 to a halt. The time of energization of relay coil 14 therefore determines at what point the tuning of the local oscillator stops during search; and to assure that it stops on the proper I.-F. image, the following arrangement is provided.

The output of I.-F. amplifier 4 is connected to a frequency discriminator 17 which is common both to the frequency search unit and frequency tracking unit. The frequency discriminator produces pulses corresponding to the input pulses of R.-F., the polarity and amplitudes of the discriminator pulses varying in accordance with the I.-F. frequency applied to the discriminator. These pulses are applied over a line 18 to two channels 19 and 20 in the frquency search unit, these channels being respectively a "stop" and a "go" control.

Considering channel 19 (the "stop" control), the output of frequency discriminator 17 is applied via line 18 through the front contact 21 and armature 22 of a relay 23 to an "AND" circuit 24.

Positive pulses are applied to the "AND" circuit from detector 5 via amplifier 25 and delay device 26; and when the pulses from the frequency discriminator are likewise positive, the coincidence of these pulses produces an output from the "AND" circuit 24 which, if sufficiently large, is amplified in an amplifier 27 which has a minimum threshold level above which the input signal must rise to produce an output. (The delay device 26 balances the delay introduced by the discriminator, to thereby insure proper coincidence of the pulses.) The output of the threshold amplifier 27 is then fed through an inhibitor circuit 28 whose output is then applied via line 29 to a relay control circuit 30 in which the pulses charge a condenser to a value at which relay coil 14 is energized, thereby bringing motor 9 to a halt and stopping the search. This likewise de-energizes relay coil 31 of relay 23 whose armature then swings back to the back contact 32 connecting one output of the "AND" circuit 24 via a voltage divider 33 and line 34 to the output of the delay device 26, the presence of pulses from the delay device 26 at both inputs to the "AND" circuit 24 providing an output therefrom through the threshold amplifier 27 and inhibitor circuit 28 to relay control 30 to maintain relay 13 energized and thereby prevent the armature 12 falling back to the back contact 11 and starting search over again. Control of the tuning of the local oscillator will then be taken over by the automatic frequency tracking system 8.

The de-energization of relay 23 also disconnects the "go" channel 20 from the output of frequency discriminator 17 by permitting its armature 35 to fall back to the back contact 36 and away from the forward contact 37 which is connected to line 18 and the output of frequency discriminator 17.

As has been pointed out hereinbefore, the system is arranged to prevent stopping on the wrong image. As will be pointed out hereinafter in connection with Fig. 2 (curve B), as the local oscillator is scanned upward in frequency, the discriminator output is first positive and then negative as the desired image is passed and is then first negative and then positive as the undesired image is passed. It has been shown how the "stop" channel 19 is actuated by a positive pulse output from the frequency discriminator. Such a positive output will not actuate the "go" channel 20, as will be seen from the following. The output of frequency discriminator 17 is connected to the "go" channel 20 via lead 18, forward contact 37 and armature 35 of relay 23 to a phase inverter amplifier 38 which changes the positive pulses to negative and applies them to one input 39 of an "AND" circuit 40 whose other input 41 is connected via lead 34 to the output of delay device 26. As pointed out hereinbefore, input 41 receives positive pulses, but input 39 receives negative pulses as a result of the polarity inversion produced by amplifier 38; and consequently, the "AND" circuit 40, which only operates when positive pulses are applied coincidently to both its inputs, will not produce any output. Therefore, it will be seen that "go" channel 20 is inoperative when positive pulses are being received from frequency discriminator 17.

When, however, negative pulses are being received from the output of frequency discriminator 17, these are inverted in the amplifier 38 and applied as positive pulses to the "AND" circuit coincidently with pulses from delay device 26. The coincidence of these pulses produces an output from the "AND" circuit 40, this output being integrated in an integrator 42, which can be in any form, such as a simple R.-C. circuit, the integrated output voltage of integrator 42 being applied via line 43 to block or inhibit circuit 28. This prevents any pulses from the "stop" channel 29, and specifically from the threshold amplifier 27, from passing through the inhibitor circuit and operating the relay control to halt scanning.

The system is designed to scan in one direction, that is, from the lowest local oscillator frequency to the highest. Thus, the motor 9 drives a cam which sweeps the klystron local oscillator over its range during 330 degrees of cam rotation and retraces in the remaining 30 degrees. On the retrace, a second cam closes the switch arm 44 which is connected over a line 45 to the control 30, thereby shorting the input to the relay control to ground and preventing actuation of relay 13 during retrace time.

After the searching has stopped, the automatic tracking control takes over. For this purpose, the output of the discriminator 17 is applied to an integrator circuit 46 which integrates the pulses appearing at the output of the frequency discriminator and applies them as a D.-C. voltage via line 47 to the repeller electrodes of the local oscillator to control the local oscillator in accordance with the S curve characteristic of the discriminator output.

The operation of the foregoing system will be best understood from the following description of a specific arrangement in which the indicated values are solely by way of example, reference being had to the curves of Fig. 2.

In a given case the system was designed to receive pulsed R.-F. signals where the R.-F. signals could be at any frequency within a bandwidth of 500 megacycles from 34,650 mc. to 35,150 mc. The center frequency of the I.-F. amplifier was designed for 60 mc., and the local oscillator had a tuning range of 34,590 to 35,090 mc., as shown in curve A, Fig. 2. The bandwidth of the I.-F. frequency amplifier was approximately 10 mc. from 55 to 65 mc. As shown in curve A, as the local oscillator is tuned from the low end of its band 34,590 towards the upper end of its band 35,090, two images will be produced, the lower one of which in the present example is the desired stable image and the upper one of which is the undesired unstable image. Assuming in a given instance that the R.-F. of the pulse input signal is 35,000 mc., it will be seen that there is an output from the I.-F. amplifier as the local oscillator is tuned from 34,935 to 34,945, with the I.-F. output varying from 65 mc. down towards 55 mc. This corresponds to $F_{sig}-F_{lo}$. Again assuming that the input signal is 35,000 mc., as the local oscillator is varied from 35,055 mc. to 35,065 mc., the resultant I.-F. output varies from 55 mc. to 65 mc., as shown in curve A referring to the unstable image. It will thus be seen that as the local oscillator frequency varies from its lowest frequency upward at the first image the I.-F. output goes from 65 mc. down to 55 mc. As the scanning continues and the unstable image is reached, the I.-F. output goes from 55 mc. up to 65 mc. Use is made of this difference in the I.-F. frequency to differentiate between the stable and unstable images as follows.

The discriminator is arranged so as to have an S curve characteristic, as shown in curve B, giving a positive output for I.-F. signals above 60 mc. and a negative output for signals below 60 mc. Thus, 60 mc. is the center frequency or crossover for the discriminator polarity. It will accordingly be seen that if the local oscillator is swept upwards in frequency, a positive output will first be produced at the output of the discriminator 17 and then a negative output at the stable I.-F. image. If the frequency searching continues upwards to the unstable image, a negative output is first produced and then a positive output at the unstable I.-F. image.

Thus, it will be seen that when the system is in search and the local oscillator frequency is being swept upwards, a positive output is first obtained from frequency discriminator 17 if an adequate signal is being picked up. This positive output which grows from a low value at 65 mc. to a maximum at about 63 mc., as shown in curve B, at some intermediate point therebetween becomes sufficiently great to pass through the threshold amplifier and inhibitor circuit and build up on an integrating circuit in the relay control 30 a sufficient voltage to operate relay 14 and interrupt the search as indicated by curve D of Fig. 2, the line 48 indicating the threshold at which the relay 13 is energized. Energization of relay 13 de-energizes relay 21 and causes armature 22 to make contact with its back contact 32, thereby applying the pulse output of video amplifier 25 after a delay in delay device 26 to both inputs of the "AND" circuit 24. Thus, as long as input pulses of a predetermined amplitude are being received and passed through the I.-F. amplifier and video amplifier 25, pulses are being fed out through the threshold amplifier 27 and inhibitor circuit 28 to maintain the potential in the integrating circuit of relay control 30 sufficiently high to keep relay 13 operating. The operation of relay 13 de-energizes relay 23, and armature 35 of said relay also disconnects from contact 37, thereby preventing the operation of "go" channel 20 since the input of channel 20 to the phase inverting amplifier 38 is disconnected. Thus, searching is halted, and the automatic frequency control or tracking arrangement 8 takes over. The output of the frequency discriminator 17, which may be in the form of positive or negative pulses depending upon whether the I.-F. discriminator is above or below the center frequency of 60 mc., is integrated and applied to the repeller electrode of the local oscillator 3 to control the frequency thereof so that the intermediate frequency is maintained close to the center frequency of 60 mc.

Halting of the search or frequency scanning on the unstable image is prevented by the following operation of the system. Assuming that for some reason either due to absence or weakness of the signal or for other reasons the scanning passes through the I.-F. frequencies corresponding to the stable image without stopping and into the unstable I.-F. image. In the given example, this would occur when the local oscillator frequency was passing from 35,055 mc. to 35,065 mc. with the signal frequency at 35,000 mc. (see curve A, Fig. 2). The I.-F. output would start at 55 mc. and work up toward 65 mc., as shown in curve B. The output of the discriminator would first consist of negative pulses. These pulses applied in negative fashion to "AND" gate 24 would produce no output since the "AND" gate 24 requires two positive pulses at its separate inputs to produce an output. These negative pulses, however, from frequency discriminator 17 are inverted in phase inverting amplifier 38 (see curve C, Fig. 2) and applied as positive pulses to the "AND" circuit 40. These together with the corresponding delayed pulses from video amplifier 26 operate "AND" circuit 40 and build up a negative voltage, as shown in curve D at 49, by being integrated in integrator 42 and applied to inhibitor circuit 28. No pulses can then be fed through to relay control circuit 30. As the scanning continues upward with the local oscillator passing 35,060 mc., the pulsed output from frequency discriminator 17 will now become positive and circuit 40 will produce no output while "AND" circuit 24 will produce a positive pulse output. The output of "AND" circuit 24 will, however, be unable to pass through the inhibitor circuit 28 due to the negative voltage 49 in curve D which is stored in the R.-C. circuit of the integrator 42 and applied to inhibitor circuit 28. Thus, the scanning will continue past the unstable image to the top of the local oscillator range at 35,090 mc.; and then after a quick retrace during which microswitch 44 is opened by the cam of the motor so as to block operation of the relay control, searching will start again at the lowest frequency of local oscillator 3, which in the given example is 34,590 mc., and will continue upward until the stable image of the I.-F. amplifier output is reached.

While I have described above the principles of my invention in connection with specific apparatus, it is to be clearly understood that this description is made only by way of example and not as a limitation to the scope of my invention as set forth in the objects thereof and in the accompanying claims.

I claim:

1. An automatic frequency search system for tuning an oscillator over a given frequency range and halting said tuning when the oscillator frequency bears a predetermined relationship to the frequency of a wave from another source comprising an oscillator whose frequency is to be controlled, a wave source, means for scanning said oscillator over a given frequency range, means for mixing the output of said oscillator with said wave, means coupled to the output of said mixing means for passing a narrow frequency band of the mixed frequencies, detection means coupled to said mixing means, a discriminator means coupled to the output of said narrow frequency band passing means for producing an output voltage of one polarity in response to frequencies in said narrow band on one side of a predetermined crossover point and for producing an output voltage of the opposite polarity in response to frequencies in said narrow band on the other side of said crossover point, an AND circuit, means coupled the output of said discriminator and said detection means to said AND circuit, means responsive to the coincidence of the output of said detection means and to said voltage of one polarity for stopping the scanning by said frequency scanning means, and means responsive to the coincidence of the output of said detection means and to said voltage of the opposite polarity for inhibiting said scanning-stopping means for a given interval.

2. An automatic frequency search system for tuning an oscillator over a given frequency range and halting said tuning when the oscillator frequency bears a predetermined relationship to the frequency of a wave from another source comprising an oscillator whose frequency is to be controlled, a wave source, means for scanning said oscillator over a given frequency range, means for mixing the output of said oscillator with said wave, means coupled to the output of said mixing means for passing a narrow frequency band of the mixed frequencies, detection means coupled to said mixing means, a discriminator means coupled to the output of said narrow frequency band passing means for producing an output voltage of one polarity in response to frequencies in said narrow band on one side of a predetermined crossover point and for producing an output voltage of the opposite polarity in response to frequencies in said narrow band on the other side of said crossover point, means responsive to the output of said detection means and to said voltage of one polarity for stopping the scanning by said frequency scanning means, means responsive to the output of said detection means and to said voltage of the opposite polarity for inhibiting said scanning-stopping means for a given interval and means coupled to the scanning-stopping means for rendering inoperative said inhibiting means upon operation of said scanning-stopping means.

3. An automatic frequency search system for tuning an oscillator over a given frequency range and halting said tuning when the oscillator frequency bears a predetermined relationship to the frequency of a wave from another source comprising an oscillator whose frequency is to be controlled, a wave source, means for scanning said oscillator over a given frequency range, means for mixing the output of said oscillator with said wave, means coupled to the output of said mixing means for passing a narrow frequency band of the mixed frequencies, detection means coupled to said mixing means, a discriminator means coupled to the output of said narrow frequency band passing means for producing an output voltage of one polarity in response to frequencies in said narrow band on one side of a predetermined crossover point and for producing an output voltage of the opposite polarity in response to frequencies in said narrow band on the other side of said crossover point, an AND circuit, means coupling the output of said discriminator and said detection means to said AND circuit, means responsive to the coincidence of the output of said detection means and to said voltage of one polarity for stopping the scanning by said frequency scanning means, and means responsive to the output of said narrow frequency band passing means on either side of said crossover point for maintaining said frequency scanning means inoperative upon operation of said frequency scanning-stopping means.

4. An automatic frequency search and control receiver adapted to receive pulsed radio frequency signals comprising an oscillator whose frequency is to be controlled, a signal source, means for scanning repeatedly said receiver over a given frequency range from one end of said range to the other end thereof, means for mixing the output of said oscillator with said signal, an intermediate frequency amplifier coupled to the output of said mixing means and adapted to pass a narrow frequency band of the mixed frequencies, means coupled to said intermediate frequency amplifier for detecting said pulses, a discriminator coupled to the output of said intermediate frequency amplifier for producing an output voltage of one polarity in response to frequencies in said band on one side of a predetermined crossover point and producing an output voltage of the opposite polarity in response to frequencies in said narrow band on the other side of said crossover point, an AND circuit, means coupling the output of said discriminator and said detection means to said AND circuit, means responsive to the coincidence of said voltage of one polarity and to said detected pulses for stopping the scanning by said frequency scanning means, and an automatic frequency control means coupled to the output of said discriminator for controlling the frequency of said oscillator to maintain the intermediate frequency amplifier output close to the crossover frequency.

5. An automatic frequency search and control receiver according to claim 4, further including means responsive to said coincidence of said voltage of one polarity and said detected pulses for maintaining said scanning means inoperative.

6. An automatic frequency search and control receiver according to claim 5, further including another AND circuit, means coupling the output of said detection means and said voltage of opposite polarity to said other AND circuit, means responsive to the coincidence of the output of said detection means and said voltage of the opposite polarity for inhibiting said scanning-stopping means for a given interval.

7. An automatic frequency search and control receiver adapted to receive pulsed radio frequency signals comprising an oscillator whose frequency is to be controlled, a signal source, means for scanning repeatedly said receiver over a given frequency range from one end of said range to the other end thereof, means for mixing the output of said oscillator with said signal, an intermediate frequency amplifier coupled to the output of said mixing means and adapted to pass a narrow frequency band of the mixed frequencies, means coupled to said intermediate frequency amplifier for detecting said pulses, a discriminator coupled to the output of said intermediate frequency amplifier for producing an output voltage of one polarity in response to frequencies in said band on one side of a predetermined crossover point and producing an output voltage of the opposite polarity in response to frequencies in said narrow band on the other side of said crossover point, means coupled to the output of said discriminator and responsive to the coincidence of said voltage of one polarity and to said detected pulses for stopping the scanning by said frequency scanning means, an automatic frequency control means coupled to the output of said discriminator for controlling the frequency of said oscillator to maintain the intermediate frequency amplifier output close to the crossover frequency, said coincidence means including means responsive to said detected pulses for maintaining said scanning means inoperative and means coupled to the output of said discriminator and responsive to said voltage of the opposite polarity for inhibiting said scanning-stopping means for a given interval, said inhibiting means including a second coincidence circuit whose inputs are coupled to said discriminator and said pulse detecting means, and an inhibitor circuit in said scanning-stopping means coupled to the output of said second coincidence circuit to inhibit said scanning-stopping means for a given interval.

8. An automatic frequency search and control receiver according to claim 7, further including means coupled to the scanning-stopping means for rendering inoperative said inhibiting means during operation of said scanning-stopping means.

References Cited in the file of this patent

UNITED STATES PATENTS

| | | |
|---|---|---|
| 2,783,383 | Robins | Feb. 26, 1957 |
| 2,797,325 | Cox et al. | June 25, 1957 |
| 2,852,669 | Ashby | Sept. 16, 1958 |

FOREIGN PATENTS

| | | |
|---|---|---|
| 641,900 | Great Britain | Aug. 23, 1950 |